(12) United States Patent  (10) Patent No.: US 8,194,206 B2
Shimura et al.  (45) Date of Patent: Jun. 5, 2012

(54) PLANAR LIGHT-EMITTING DEVICE AND LIQUID CRYSTAL DISPLAY APPARATUS

(75) Inventors: Takashi Shimura, Yamanashi-ken (JP); Taku Kumasaka, Tsuru (JP)

(73) Assignee: Citizen Electronics Co., Ltd., Yamanashi-ken (JP)

( * ) Notice: Subject to any disclaimer, the term of this patent is extended or adjusted under 35 U.S.C. 154(b) by 438 days.

(21) Appl. No.: 12/471,719

(22) Filed: May 26, 2009

(65) Prior Publication Data

US 2009/0290094 A1   Nov. 26, 2009

(30) Foreign Application Priority Data

May 25, 2008 (JP) ................................. 2008-136134
Oct. 15, 2008 (JP) ................................. 2008-266909

(51) Int. Cl.
*G02F 1/1335* (2006.01)
(52) U.S. Cl. ................. 349/62; 349/56; 349/61; 349/63; 349/65; 349/69
(58) Field of Classification Search .................... 349/56, 349/61–63, 65, 69, 70
See application file for complete search history.

(56) References Cited

U.S. PATENT DOCUMENTS

| 7,560,745 | B2 * | 7/2009 | Kim et al. ...................... 257/98 |
| 2009/0073683 | A1 * | 3/2009 | Chen et al. .................... 362/224 |
| 2010/0073903 | A1 * | 3/2010 | Yun et al. ..................... 362/97.1 |
| 2011/0115696 | A1 * | 5/2011 | Pankaj et al. ................. 345/102 |

FOREIGN PATENT DOCUMENTS

JP   11-288611   10/1999

\* cited by examiner

*Primary Examiner* — Jennifer Doan
(74) *Attorney, Agent, or Firm* — Wenderoth, Lind & Ponack, L.L.P.

(57) ABSTRACT

A planar light-emitting device allowing for high luminance uniformity has a plurality of light-emitting units (4), each including a lightguide plate (3) having a light-exiting surface, an opposite surface opposite to the light-exiting surface, a peripheral side surface extending between the respective peripheral edges of the light-exiting surface and the opposite surface, and a light-entrance surface (3a) defined by a part of the peripheral side surface. Each light-emitting unit further includes a light source (2) adjacently disposed to face the light-entrance surface to emit light into the lightguide plate through the light-entrance surface. The light-emitting units are arranged in a plurality of mutually adjacent rows with the light-exiting surfaces (3a) of their respective lightguide plates being substantially flush with each other. Adjacent rows of the light-emitting units are displaced relative to each other in the direction of the rows.

18 Claims, 12 Drawing Sheets

PLANAR LIGHT-EMITTING DEVICE AND LIQUID CRYSTAL DISPLAY APPARATUS

This application claims priority under 35 U.S.C. §119 to Japanese Patent application No. JP2008-136134 filed on May 25, 2008 and Japanese Patent application No. JP2008-266909 filed on Oct. 15, 2008, the entire contents of which are hereby incorporated by reference.

TECHNICAL FIELD

The present invention relates to a planar light-emitting device that illuminates a liquid crystal display panel or the like. The present invention also relates to a liquid crystal display apparatus having the planar light-emitting device.

BACKGROUND ART

Liquid crystal display apparatuses for image display are widely used as large-sized displays of flat-screen televisions and monitors, etc. These liquid crystal display apparatuses employ a backlight unit that applies illuminating light to a liquid crystal display panel from the back or the lower side of the liquid crystal display panel to enhance the luminance of the display screen.

The above-described backlight unit has a lightguide plate and a light-emitting diode (LED) light source disposed at a peripheral side surface of the lightguide plate. The lightguide plate guides light from the light source through the lightguide plate and emits the guided light from the whole area of a light-exiting surface of the lightguide plate toward a liquid crystal display panel that faces the lightguide plate.

Recently, as liquid crystal televisions increase in size, there has been a demand for further reduction in weight and thickness of backlight units used in the liquid crystal televisions. In this regard, as the thickness of lightguide plates in backlight unit is reduced, it becomes more likely that color irregularity and luminance unevenness will occur on the light-exiting surface of the lightguide plate. If injection molding is employed as a method of producing a large-sized lightguide plate, it is difficult to fill the resin material throughout the molding tool for the large lightguide plate. This problem can be solved by increasing the injection pressure. This, however, causes an increase in cost of equipment.

Meanwhile, there has been developed a planar light-emitting device in which a plurality of lightguide plates having respective light sources are arranged in a matrix with their respective light-exiting surfaces being flush with each other to obtain a wide light-exiting surface as a whole (see Japanese Patent Application Publication No. Hei 11-288611).

The above-described conventional planar light-emitting device, however, still has the following problems to be solved.

The light sources of the lightguide plates arrayed in a matrix are all arranged to emit light in the same direction. Therefore, the pattern of highs and lows in the luminance distribution on one lightguide plate matches that on another plate adjacent to it. These highs-lows patterns affect each other to aggravate the luminance unevenness, resulting in an uneven overall distribution of luminance on the light-exiting surface of the planar light-emitting device. When lightguide plates are regularly arranged in a matrix, the vertical and horizontal joints between four mutually adjacent lightguide plates intersect each other in a cross shape, and the center of the cross-shaped intersection is likely to become a dark spot because a sufficient amount of light cannot reach there.

SUMMARY OF THE INVENTION

The present invention has been made in view of the above-described problems with the conventional technique. Accordingly, an object of the present invention is to provide a planar light-emitting device having a plurality of lightguide plates arranged side by side to obtain a large light-exiting surface, which is designed to be capable of obtaining high luminance uniformity over the entire light-exiting surface. Another object of the present invention is to provide a liquid crystal display apparatus using the planar light-emitting device of the present invention.

The present invention provides a planar light-emitting device including a plurality of light-emitting units. Each light-emitting unit includes a lightguide plate having a light-exiting surface, an opposite surface opposite to the light-exiting surface, a peripheral side surface extending between the respective peripheral edges of the light-exiting surface and the opposite surface, and a light-entrance surface defined by a part of the peripheral side surface. Each light-emitting unit further includes a light source disposed adjacently opposite to the light-entrance surface to emit light into the lightguide plate through the light-entrance surface. The light-emitting units are arranged in a plurality of rows so that the lightguide plates in one of mutually adjacent rows of the guideplate are displaced relative to the lightguide plates in the other of the adjacent rows with the light-exiting surfaces of their respective lightguide plates being substantially flush with each other.

In the planar light-emitting device, the directions of light entering the lightguide plates of the light-emitting units may be the direction of the rows.

The directions of light entering the lightguide plates of the light-emitting units in each row may be one direction along the direction of the rows. In this case, the directions of light entering the lightguide plates of the light-emitting units in all the rows may be the same as each other. Alternatively, the arrangement may be as follows. The directions of light entering the lightguide plates of the light-emitting units in alternate rows are the same as each other, and the directions of light entering the lightguide plates of the light-emitting units in the remaining rows are opposite to each other.

The directions of light entering the lightguide plates of the light-emitting units may be, as viewed in a plan view, perpendicular to the direction of the rows. In this case, the directions of light entering the lightguide plates of the light-emitting units in all the rows may be the same as each other. Alternatively, the directions of light entering the lightguide plates of the light-emitting units may be reversed for every row.

The planar light-emitting device may be arranged as follows. The lightguide plates of the light-emitting units have a regular quadrangular shape and are arranged in a matrix of vertical rows and horizontal rows. Adjacent rows in one of the vertical and horizontal rows are displaced relative to each other in the direction in which the lightguide plates are aligned in each of the adjacent rows. In this case, the directions of light entering the lightguide plates of the light-emitting units may be the direction of the one of the vertical and horizontal rows in which the lightguide plates are aligned. The directions of light entering the lightguide plates of the light-emitting units may be one direction along the direction of the one of the vertical and horizontal rows. Further, the directions of light entering the lightguide plates of all the light-emitting units may be the same as each other.

The arrangement may be as follows. The directions of light entering the lightguide plates of the light-emitting units in alternate rows of the one of the vertical and horizontal rows are the same as each other, and the directions of light entering the lightguide plates of the light-emitting units in the remaining lows are opposite to those in the alternate rows.

The directions of light entering the lightguide plates in the matrix-arranged light-emitting units may be, as viewed in a plan view, perpendicular to the direction of the one of the vertical and horizontal rows. In this case, the directions of light entering the lightguide plates of the light-emitting units in all the rows may be the same as each other. Alternatively, the directions of light entering the lightguide plates of the light-emitting units in the one of the vertical and horizontal rows may be opposite to each other for every row in one of the vertical and horizontal rows.

In addition, the present invention provides a liquid crystal display apparatus including a liquid crystal display panel and a planar light-emitting device arranged as stated above, which is disposed at the lower side of the liquid crystal display panel.

In the planar light-emitting device of the present invention, light-emitting units are arranged in a plurality of rows, and the lightguide plates in each pair of adjacent rows are displaced relative to each other in the direction of the rows. Consequently, the pattern of highs and lows in the luminance distribution does not match between each pair of adjacent rows, hence, enhanced luminance uniformity can be obtained as a whole. The liquid crystal display apparatus having the planar light-emitting device can display a favorable image of large area by virtue of the high luminance uniformity.

Embodiments of the planar light-emitting device and liquid crystal display apparatus according to the present invention will now be explained below with reference to the accompanying drawings. It should be noted that the scale of the figures used in the following description is properly changed to show each constituent member in a recognizable size.

DETAILED DESCRIPTION OF THE INVENTION

Figure 1:
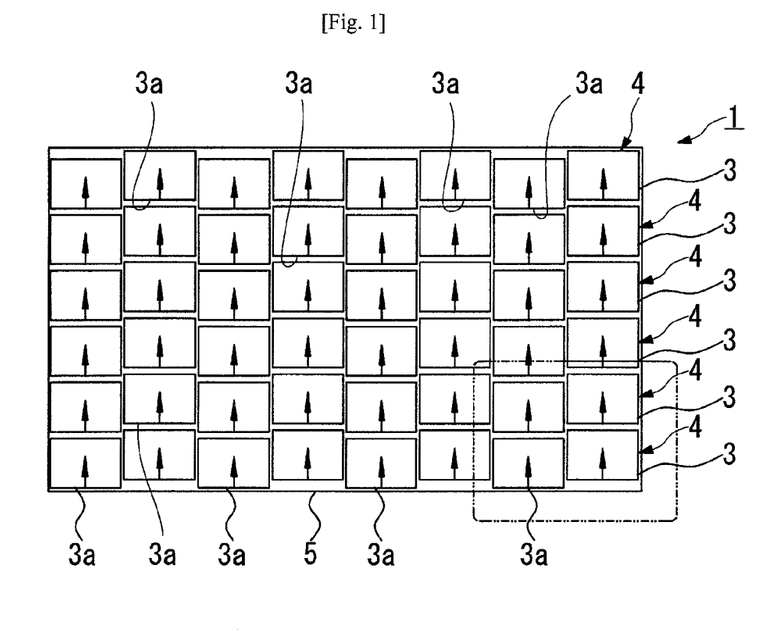
FIG. 1 is a plan view of a planar light-emitting device according to a first embodiment of the present invention.
Figure 2:
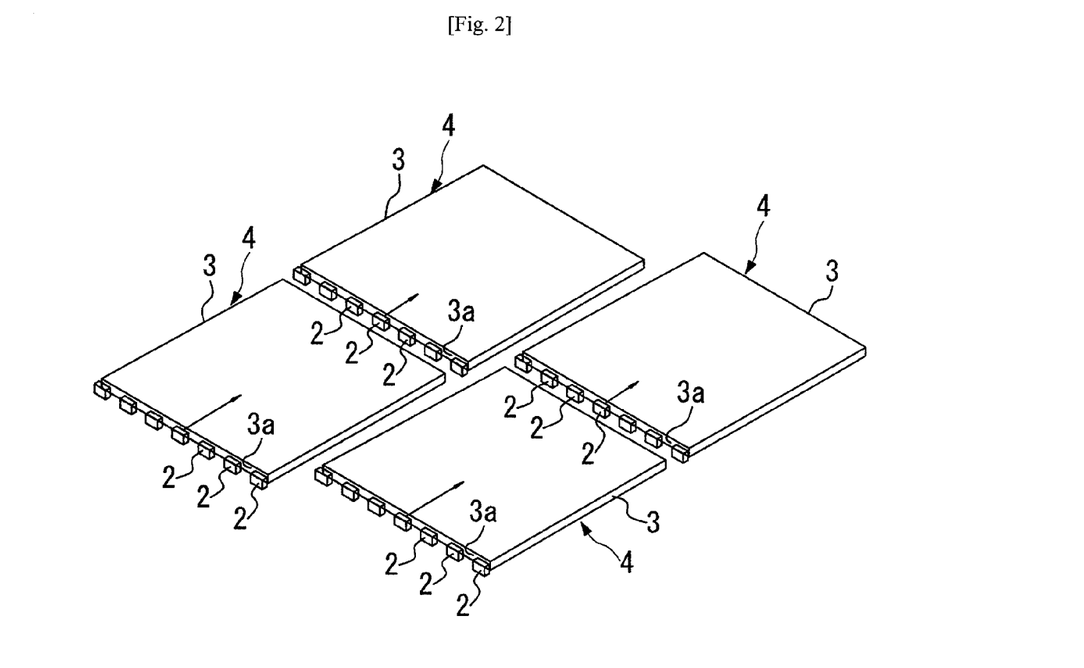
FIG. 2 is a perspective view schematically showing four mutually adjacent light-emitting units encircled with the imaginary line in FIG. 1.
Figure 3:
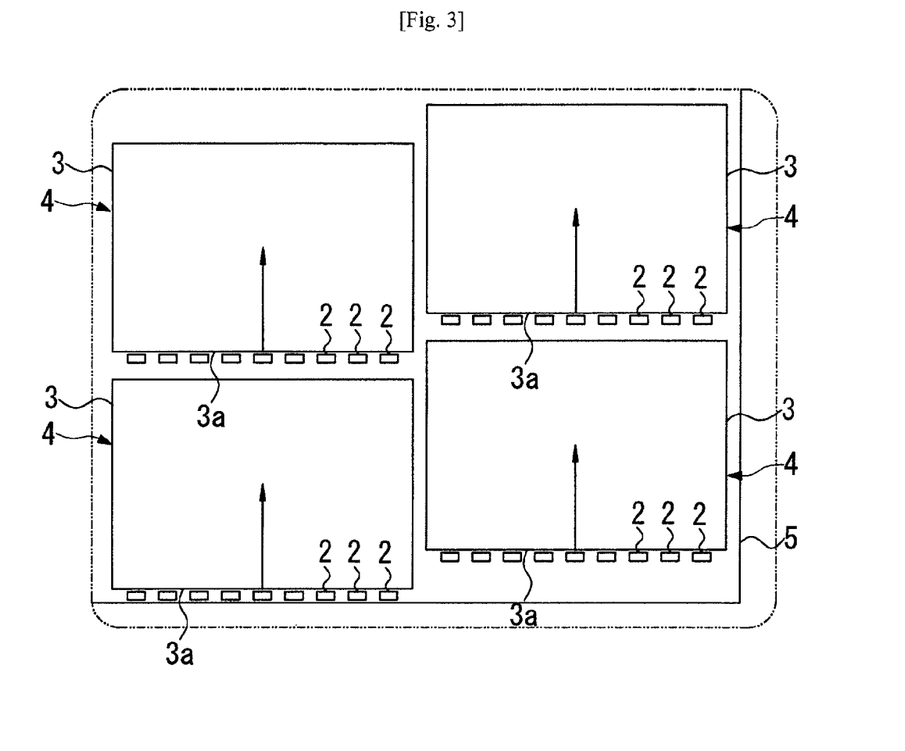
FIG. 3 is a plan view of the four light-emitting units shown in FIG. 2.
Figure 4:
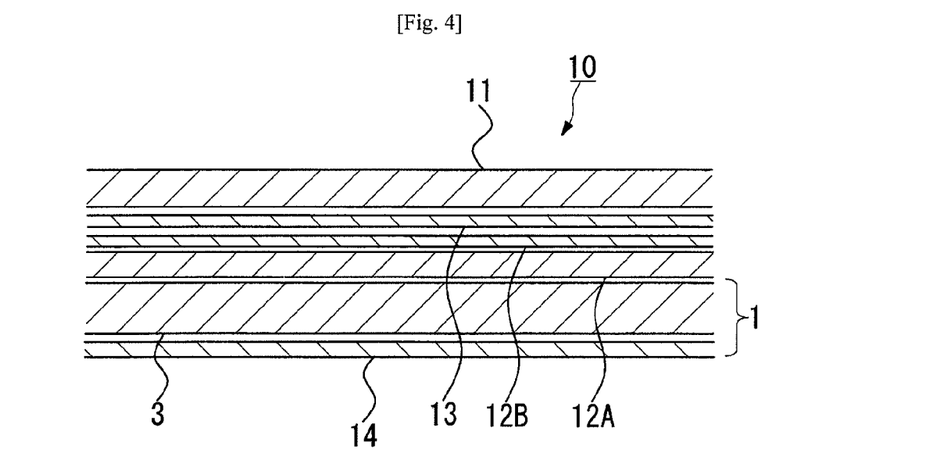
FIG. 4 is a fragmentary enlarged vertical sectional view of a liquid crystal display apparatus having the planar light-emitting device according to the first embodiment.

FIGS. 1 to 3 show one embodiment of a planar light-emitting device 1 according to the present invention, and FIG. 4 shows a liquid crystal display apparatus 10 using the planar light-emitting device 1. The planar light-emitting device 1 is used as a backlight unit of the liquid crystal display apparatus 10, and the planar light-emitting device 1 has a plurality of light-emitting units 4. Each light-emitting unit 4 has, as shown in FIG. 2, a lightguide plate 3 having an upper surface as a light-exiting surface, a lower surface opposite to the upper surface, and a peripheral side surface between the upper surface and the lower surface, and a plurality of LED light sources (light source) 2 provided at a light-entrance surface 3a that is one part of the peripheral side surface of the lightguide plate 3. The peripheral side surface of the lightguide plate 3 having a front-side surface, a rear-side surface opposite to the front-side surface, and right and left side surfaces each connecting both ends of the front-side surface and the rear-side surface. As shown in FIG. 1, the plurality of light-emitting plates 3 included in the plurality of light-emitting units 4 are disposed one behind the other and aligned in each of the vertical rows of the light-emitting plates 3. The adjacently disposed vertical rows that are arranged side by side are slightly displaced or shifted each other in a vertical direction. That is, the front-side surfaces and rear-side surfaces of the lightguide plates 3 in the planar light-emitting device 1 are not aligned. In the illustrated example, the LED light sources 2 are disposed to face the front-side surface of each of the lightguide plates 3 in the light-emitting device 1, lightguide plates 3 in the odd-numbered vertical rows, as counted from the right, are slightly displaced ahead in a direction of light entering and traveling direction that is shown as arrows in FIG. 1, relative to lightguide plates 3 in the even-numbered vertical rows. The upper surfaces serving as the light-exiting surfaces of the lightguide plates 3, are substantially flush with each other and serve as the integrated light-exiting surface of the planar light-emitting device 1.

In FIG. 1, the arrows indicate the directions in which light from the LED light sources 2 enters the associated lightguide plates 3. As shown by the arrows, the directions of light entering and traveling through the lightguide plates 3 are the same as each other (upward as seen in FIG. 1). In this embodiment, however, light-entrance surfaces 3a of light-emitting devices disposed side by side are displaced relative to each other, and not aligned. Therefore, the luminance distributions on the horizontally adjacent lightguide plates 3 are displaced relative to each other. Consequently, the planar light-emitting device 1 has a uniform overall distribution of luminance on its integrated light-exiting surface. In addition, the peripheral side surfaces of four mutually adjacent lightguide plates 3 can be prevented from forming a gap of a cross line. Therefore, it is possible to avoid the occurrence of a dark spot that would otherwise appear in the center of a cross-shaped gap formed between the peripheral side surfaces of the four mutually adjacent lightguide plates as experienced with the above-described conventional lightguide plates arrangement. Accordingly, the liquid crystal display apparatus 10 using the planar light-emitting device 1 as a backlight unit will have a uniform luminance distribution on the display screen and provide a favorable image display surface of large area.

The lightguide plates 3 are each rectangular in shape and arranged such that six lightguide plates 3 are aligned in each of eight vertical rows that are arranged side by side. With this arrangement, the planar light-emitting device 1 has an aspect ratio of 16:9, which is the mainstream aspect ratio for large-sized backlight units.

The lightguide plates 3 are formed of a transparent polycarbonate or acrylic resin, for example. The lightguide plates 3 are secured, for example, to respective bezels (not shown), and in this state, installed on a rigid board 5. The LED light sources 2 of each lightguide plate 3 are connected to a flexible printed circuit board (not shown) secured to the bezel.

Each lightguide plate 3 preferably has a plurality of light-entrance prisms (not shown) of, for example, V-shaped sectional configuration formed on each of the regions of the light-entrance surface 3a and the regions each face the LED light sources 2. The light entrance prisms allow light entering through the light-entrance surface 3a to be propagated while being diffused in the width direction of the light-entrance surface 3a. For the same reason, it is preferable that a white dot pattern (not shown), for example, will be formed on the upper surface of the lightguide plate 3, which is a light-exiting surface. The upper surface of the lightguide plate 3 or its lower surface, which is opposite to the upper surface, may be provided with prism- or lenticular lens-shaped microscopic optical configurations. If the upper or lower surface is provided with prism-shaped microscopic optical configurations, the apex angle of the prisms is configured to be gradually increased with the prism-shaped microscopic optical configurations being situated farther away from the LED light sources 2. In addition, the depth of the prism configuration is configured to be gradually increased or the prism pitch is configured to be gradually decreased.

The LED light sources 2 may be white LEDs installed with their light-exiting surfaces facing the light-entrance surface 3a. Each white LED is, for example, a semiconductor light-emitting element, e.g. a blue (wavelength λ: 470 to 490 nm) LED element or an ultraviolet (wavelength λ: less than 470 nm) LED element, which may be formed by stacking a plurality of semiconductor layers of a gallium nitride compound semiconductor (e.g. InGaN compound semiconductor) on an insulating substrate, e.g. a sapphire substrate, and sealing the stack of semiconductor layers with a resin material. The resin material may be formed, for example, by adding a YAG fluorescent substance into a silicone resin as a main component. The YAG fluorescent substance converts blue or ultraviolet light from the semiconductor light-emitting element into yellow light, and white light is produced by color mixing effect. It is preferable that the LED light source 2 will have a reflecting frame formed over the peripheral surfaces of the resin material except the front end surface to emit light only from the front end surface. It should be noted that various white LEDs besides those described above may be used as the LED light sources 2 in the present invention.

The liquid crystal display apparatus 10 shown in FIG. 4 is a display apparatus applicable to a liquid crystal display of a large-sized liquid crystal television, for example, and has a liquid crystal display panel 11 and the above-described planar light-emitting device 1 disposed at the back or the lower side of the display panel 11.

The liquid crystal display apparatus 10 includes the planar light-emitting device 1 and a combination of a diffusing plate 12A and a diffusing sheet 12B successively laid over the planar light-emitting device 1 to make uniform, as a whole, the intensity of light directed to the liquid crystal display panel 11 from the planar light-emitting device 1. The liquid crystal display apparatus 10 further includes a prism sheet 13 disposed over the diffusing sheet 12B to direct light from the diffusing sheet 12B upward toward the liquid crystal display panel 11, which is disposed over the prism sheet 13, and a reflecting sheet 14 disposed underneath the lightguide plate 3.

The diffusing plate 12A and the diffusing sheet 12B are a plate and a sheet, respectively, made of a transparent resin, e.g. an acrylic or polycarbonate resin, having silica particles or the like dispersed in the resin.

The prism sheet 13 has on its upper surface a plurality of mutually parallel prisms. The prism sheet 13 is set with the prisms intersecting the optical axes of light from the LED light sources 2, as viewed in a top plan view. To obtain high directivity of exiting light in the upward direction, in particular, the prism sheet 13 is set with the prisms perpendicularly intersecting the optical axes of light from the LED light sources 2 as viewed in a plan view.

The reflecting sheet 14 is a metal plate, film, foil or the like having a light-reflecting function. In this embodiment, a film provided with an evaporated silver layer is employed as the reflecting sheet 14. It should be noted, however, that an evaporated aluminum layer or the like may be used in place of the evaporated silver layer. The reflecting sheet 14 is bonded onto the bezel by using double-coated adhesive tape (not shown).

The liquid crystal display panel 11 is a transmissive or semitransmissive liquid crystal display panel. In the case of a transmissive liquid crystal display panel 11, for example, it has a panel body having a liquid crystal material, e.g. TN liquid crystal or STN liquid crystal, sealed with a sealant in a gap between an upper substrate and a lower substrate, each having a transparent electrode layer, an alignment film and a polarizer.

Figure 5:
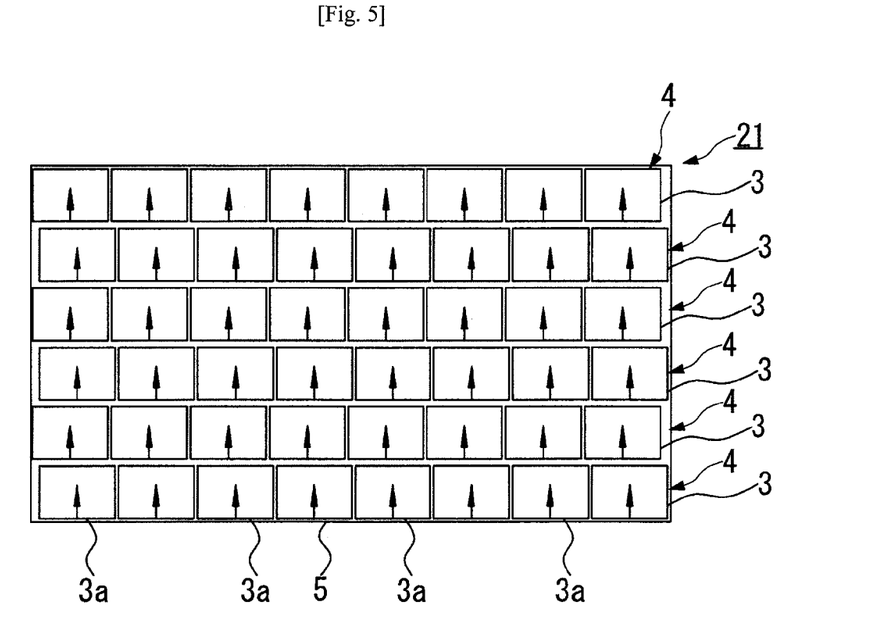
FIG. 5 is a plan view of a planar light-emitting device according to a second embodiment of the present invention.

FIG. 5 shows a planar light-emitting device 21 according to a second embodiment of the present invention. In the following explanation, the same constituent elements as those in the foregoing first embodiment are denoted by the same reference numerals as used in the first embodiment, and a detailed description of them will be omitted herein.

The second embodiment differs from the first embodiment in that, in the second embodiment, the plurality of light-emitting units 4 are aligned side by side in each of the horizontal rows. That is, the front surfaces and the rear surfaces of the lightguide plates 3 are aligned in the corresponding horizontal row. In this embodiment, the front surfaces of the lightguide plates 3 serve as light-entrance surfaces that face the light-emitting surfaces of the corresponding LED light sources 2. In adjacently disposed horizontal rows, light-emitting units in different horizontal rows that are arranged side by side are slightly displaced or shifted each other in a direction perpendicular to the light entering and traveling direction through the lightguide plates 3. That is, right and left side surfaces of the lightguide plates 3 in the planar light-emitting device 21 are not aligned. In the illustrated example, the odd-numbered horizontal rows, as counted from the bottom, are slightly displaced rightward relative to the even-numbered horizontal rows by the same amount.

In this embodiment, adjacent rows of lightguide plates are displaced or shifted relative to each other. Therefore, although the directions of light entering the lightguide plates are the same as each other, the luminance distributions on the vertically adjacent lightguide plates 3 are displaced relative to each other. Consequently, the distribution of luminance on its light-exiting surface is improved. In addition, the vertical and horizontal joints between four mutually adjacent lightguide plates 3 can be prevented from intersecting each other in a cross shape. Therefore, it is possible to avoid the occurrence of a dark spot that would otherwise appear in the center of a cross-shaped intersection of the vertical and horizontal joints.

Figure 6:
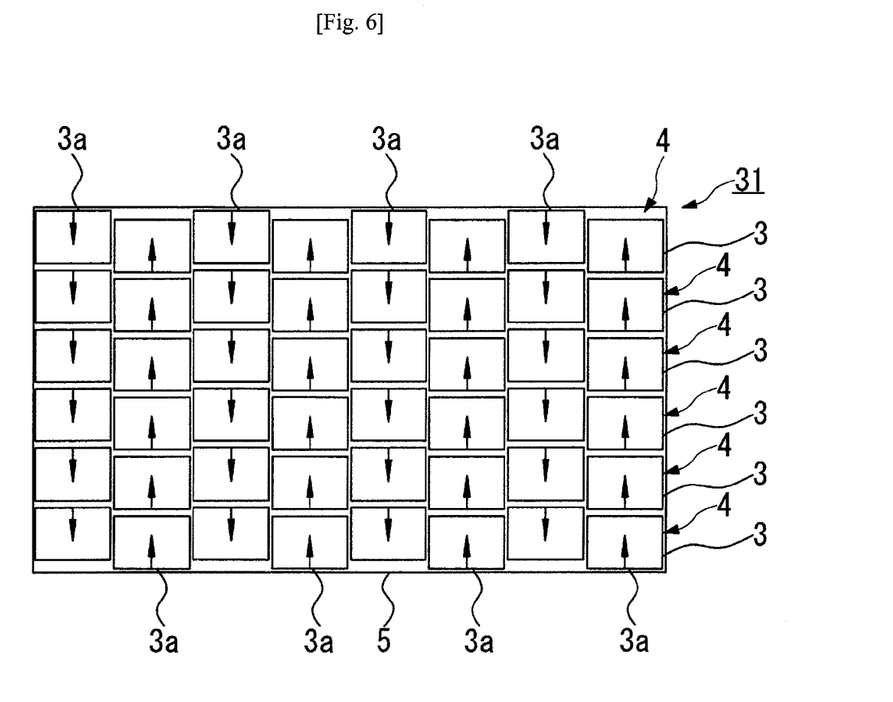
FIG. 6 is a plan view of a planar light-emitting device according to a third embodiment of the present invention.
Figure 7:
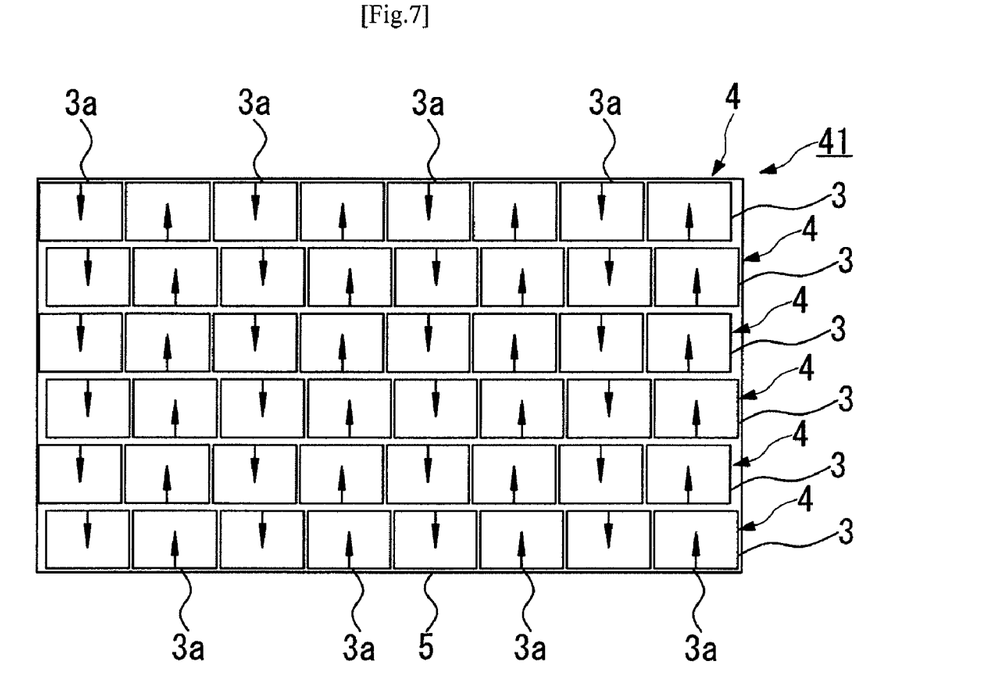
FIG. 7 is a plan view of a planar light-emitting device according to a fourth embodiment of the present invention.

FIGS. 6 and 7 show further embodiments in which the arrangements of lightguide plates are the same as those shown in FIGS. 1 and 5, respectively, but the direction of light entering the lightguide plates (and hence the direction in which the light sources face the lightguide plates) is alternately reversed for each of the vertical rows of lightguide plates. With this arrangement, horizontally adjacent lightguide plates differ from each other in the luminance distribution on their light-exiting surfaces. Consequently, the distribution of luminance on their light-exiting surfaces of the planar light-emitting devices 31 and 41 are improved. In addition, because the vertical and horizontal joints between four mutually adjacent lightguide plates 3 can be prevented from intersecting each other in a cross shape, it is possible to avoid the occurrence of a dark spot that would otherwise appear in the center of a cross-shaped intersection of the vertical and horizontal joints.

Figure 8:
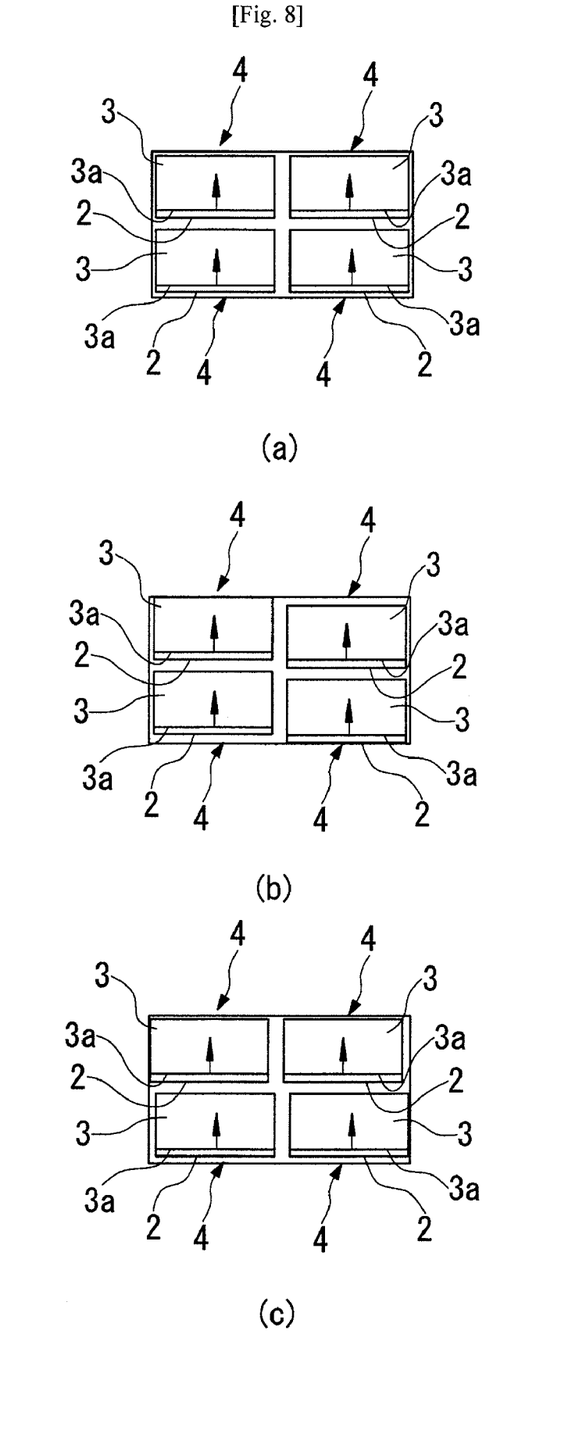
FIG. 8 is a diagram showing planar light-emitting device samples to compare planar light-emitting devices according to the present invention with a conventional planar light-emitting device, of which: part (a) is a plan view of a sample of a conventional planar light-emitting device; part (b) is a plan view of a sample of the first embodiment of the present invention; and part (c) is a plan view of a sample of the second embodiment of the present invention.

FIG. 8 shows planar light-emitting device samples in which four lightguide plate 3 are arranged in a matrix of 2 vertical rows and 2 horizontal rows. Part (a) of FIG. 8 shows a sample in which there is no displacement or shift between the horizontal rows or between the vertical rows, and the light entering direction is the same for all the lightguide plates 3, as arrows shown in FIG. 8(a). Part (b) of FIG. 8 shows a sample in which the lightguide plates in the adjacent vertical rows are displaced or shifted vertically relative to each other as in the first embodiment of the present invention. That is, the front and rear surfaces of the lightguide plates 3 are shifted and not aligned. Part (c) of FIG. 8 shows a sample in which the lightguide plates in the adjacent horizontal rows are displaced horizontally relative to each other as in the second embodiment of the present invention. That is, the right and left side surfaces of the lightguide plates 3 are shifted and not aligned. With these samples, we measured the luminance distribution on the light-exiting surface of each planar light-emitting device.

Figure 9:
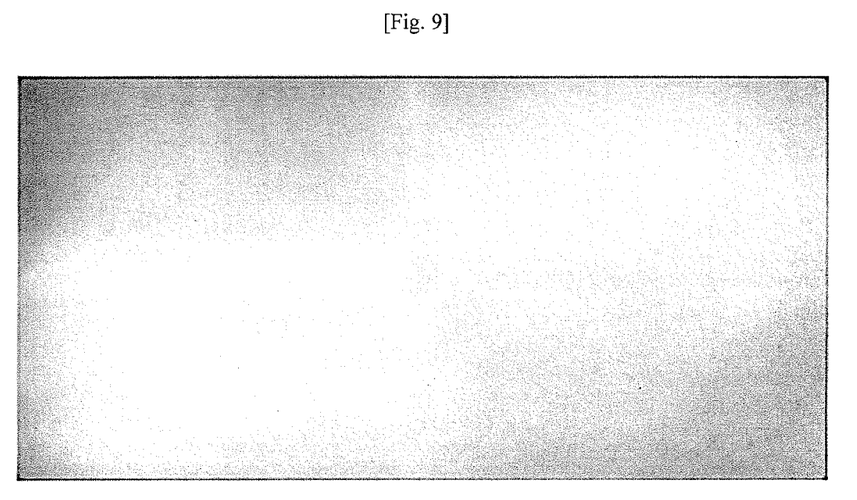
FIG. 9 is a photo showing the luminance distribution on the light-exiting surface of the planar light-emitting device sample shown in part (a) of FIG. 8.
Figure 10:
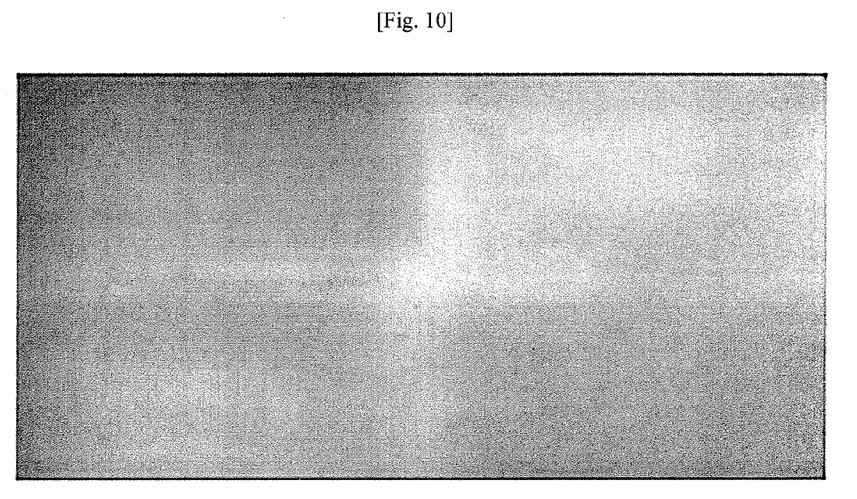
FIG. 10 is a photo showing the luminance distribution on the light-exiting surface of the planar light-emitting device sample shown in part (b) of FIG. 8.
Figure 11:
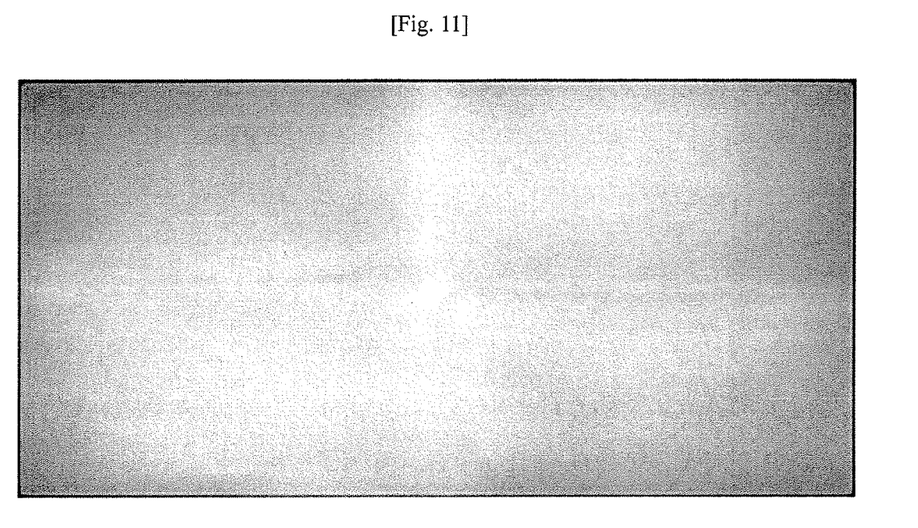
FIG. 11 is a photo showing the luminance distribution on the light-exiting surface of the planar light-emitting device sample shown in part (c) of FIG. 8.

FIGS. 9 to 11 show the results of measurement of the luminance distribution on the light-exiting surfaces of the planar light-emitting devices having the lightguide plate arrangements shown in parts (a), (b) and (c) of FIG. 8, respectively.

As will be understood from these results, the arrangement shown in part (a) of FIG. 8 has a dark spot at the center of the four lightguide plates 3 (i.e. the intersection of the vertical and horizontal joints between the lightguide plates 3), whereas the arrangements shown in parts (b) and (c) of FIG. 8 both provide an improved luminance at the centers of the planar light-emitting devices. In addition, the planar light-emitting devices shown in parts (b) and (c) of FIG. 8 each have a uniform luminance distribution as a whole.

It should be noted that the larger the number of lightguide plates are used, the more remarkable the advantages of the embodiments of the present invention shown in parts (b) and (c) of FIG. 8 can be achieved over the conventional planar light-emitting device shown in part (a) of FIG. 8, i.e. the uniformization of luminance distribution, and the increase in luminance at the cross-shaped intersection.

Figure 12:
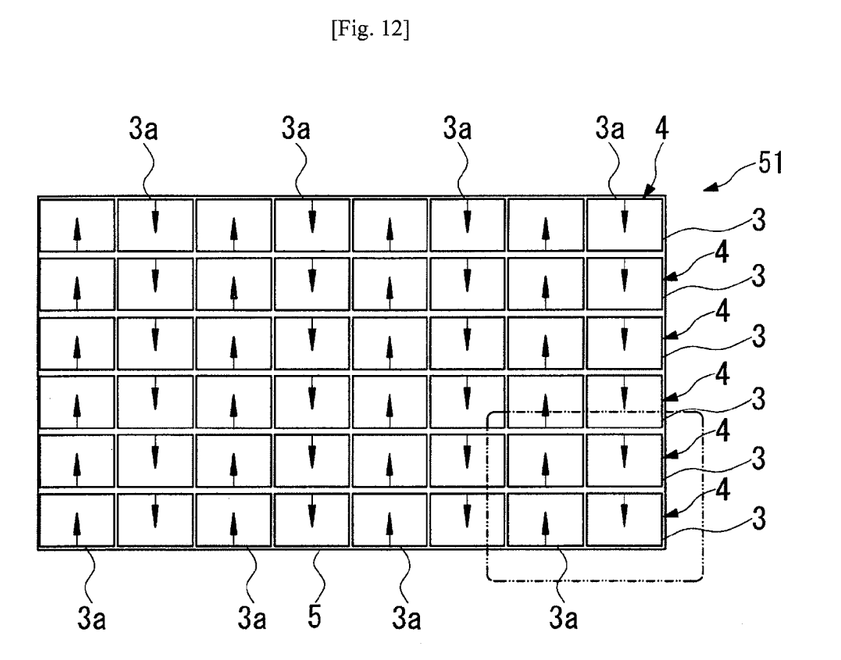
FIG. 12 is a plan view of a planar light-emitting device according to a fifth embodiment of the present invention.
Figure 13:
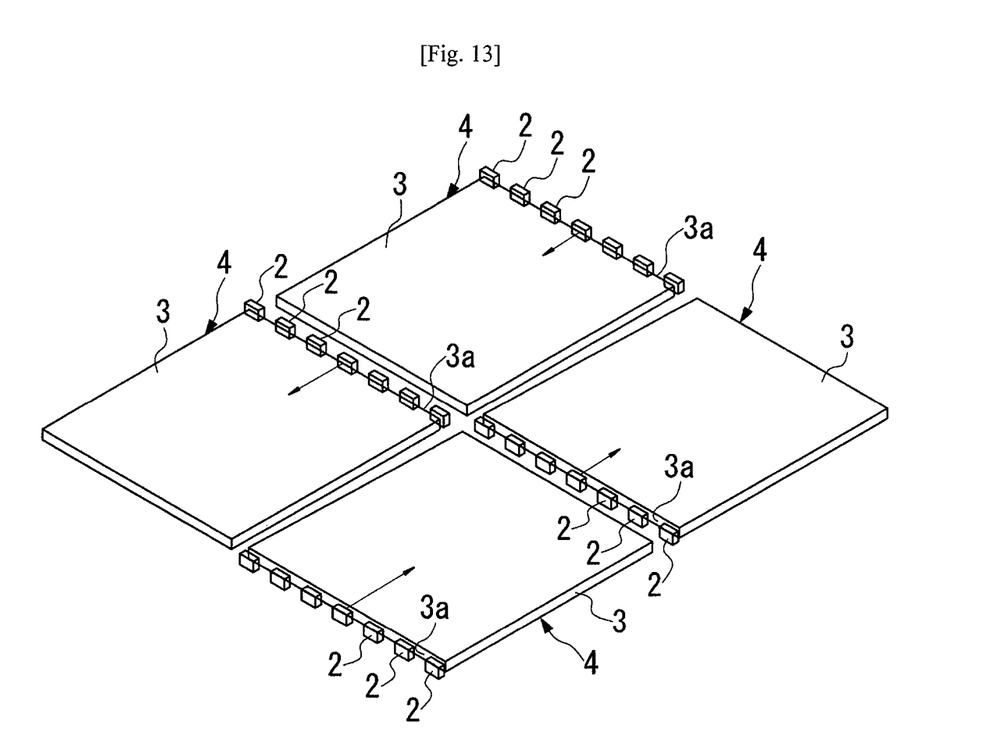
FIG. 13 is a perspective view schematically showing four mutually adjacent light-emitting units encircled with the imaginary line in FIG. 12.
Figure 14:
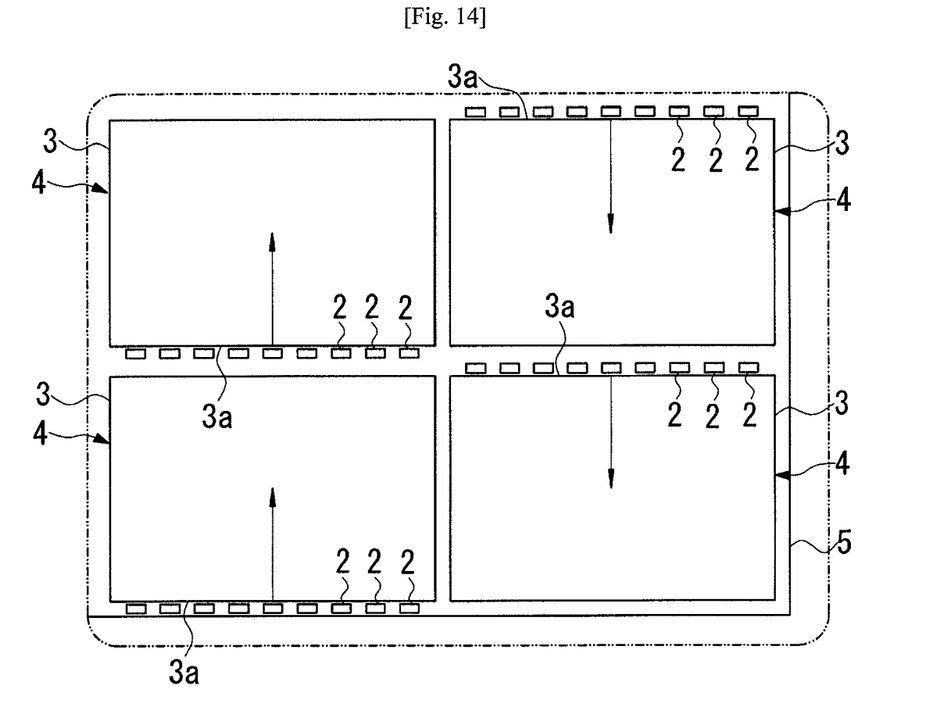
FIG. 14 is a plan view of the four light-emitting units shown in FIG. 13.
Figure 15:
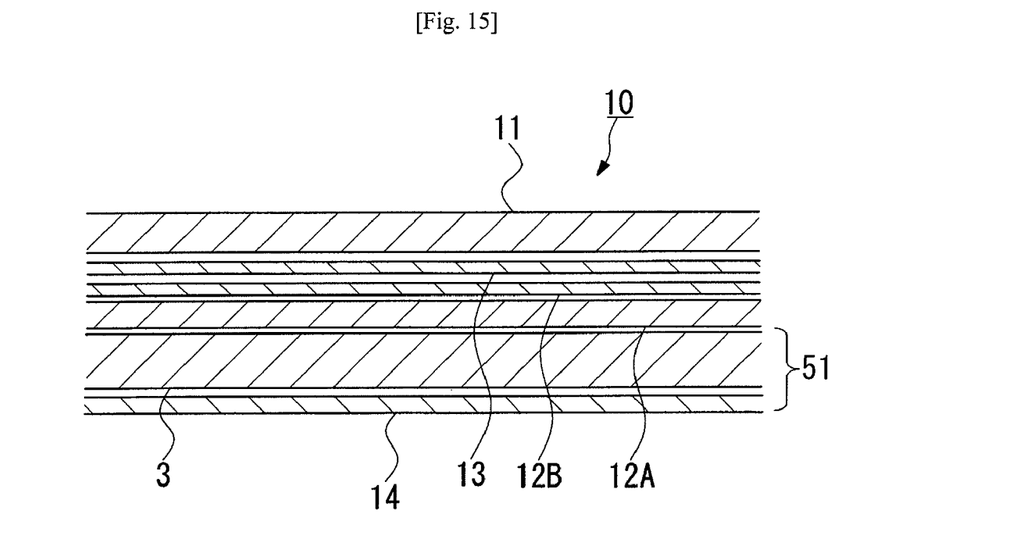
FIG. 15 is a fragmentary enlarged vertical sectional view of a liquid crystal display apparatus having the planar light-emitting device according to the fifth embodiment.

FIGS. 12 to 14 show a planar light-emitting device 51 according to a fifth embodiment of the present invention, which is a modification of the planar light-emitting device shown in FIG. 6. In this modification, no vertical displacement is provided between each pair of adjacent vertical rows, but the directions of light entering the lightguide plates are reversed for every vertical rows. That is, in the adjacently disposed vertical rows, the LED light sources 2 in one vertical row are disposed to face the front-side surfaces of the lightguide plates that are aligned in one vertical row, and the LED light sources 2 in other vertical rows disposed side by side with the one vertical row are disposed to face the rear-side surfaces of the lightguide plates that are aligned in each of the other vertical rows. With this arrangement, the front-side surfaces and rear-side surfaces of the lightguide plates 3 in the planar light-emitting device 31 are not aligned, and horizontally adjacent lightguide plates will be made to differ from each other in the luminance distribution on their light-exiting surfaces. Accordingly, it is possible to avoid horizontally adjacent lightguide plates from affecting each other to aggravate the luminance unevenness and hence possible to reduce the overall luminance unevenness on the light-exiting surface of the planar light-emitting device. FIG. 15 shows a liquid crystal display apparatus 10 using the planar light-emitting device 51. The liquid crystal display apparatus 10 has the same structure as that of the liquid crystal display apparatus 10 shown in FIG. 4.

Figure 16:
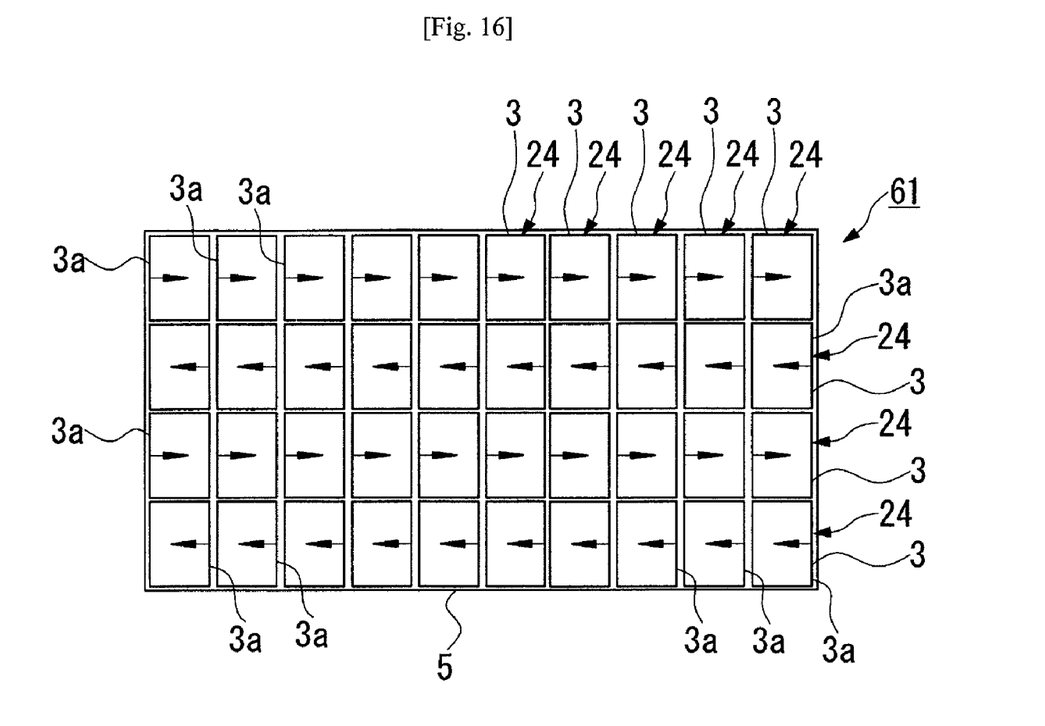
FIG. 16 is a plan view of a planar light-emitting device according to a sixth embodiment of the present invention.
Figure 17:
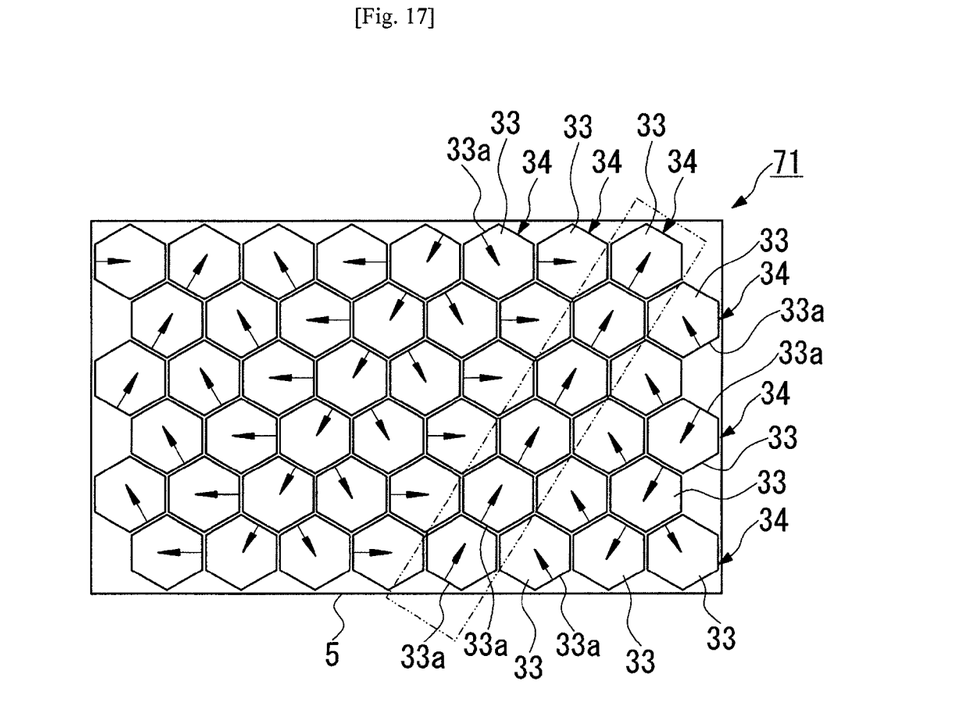
FIG. 17 is a plan view of a planar light-emitting device according to a seventh embodiment of the present invention.

FIGS. 16 and 17 show planar light-emitting devices 61 and 71 according to still further embodiments of the present invention.

The planar light-emitting device 61 shown in FIG. 16 differs from the planar light-emitting device 51 shown in FIG. 12 as follows. In the planar light-emitting device 51, the direction of the light-entrance surface 3a is alternately reversed vertically for each of the vertical rows of lightguide plates 3. In the planar light-emitting device 61, the direction of the light-entrance surface 3a is alternately reversed horizontally for each of the horizontal rows of lightguide plates 3. With this arrangement, the overall luminance uniformity on the light-exiting surface of the planar light-emitting device 61 can be enhanced in the same way as in the foregoing embodiments.

In the planar light-emitting device 71 shown in FIG. 17, hexagonal lightguide plates 33 are arranged in a honeycombs shape, and the direction of light entering each lightguide plate 33 (i.e. the direction of the light-entrance surface 33a) differ for each diagonal row of lightguide plates 33 as encircled with the imaginary line.

In the planar light-emitting device 71, the luminance distributions on their light-exiting surfaces of the lightguide plates in one of the diagonal rows are different from those in the adjacent diagonal rows. Accordingly, the overall luminance uniformity on the light-exiting surface of the planar light-emitting device 71 can be improved in the same way as in the foregoing embodiments. Although in the planar light-emitting device 71, the direction of light entering each lightguide plate is configured to be different for each right upward diagonal row of lightguide plates, it is not necessarily limited to the illustrated arrangement. For example, the direction of light entering each lightguide plate may be made different for each left upward diagonal row or each horizontal row of lightguide plates.

Figure 18:
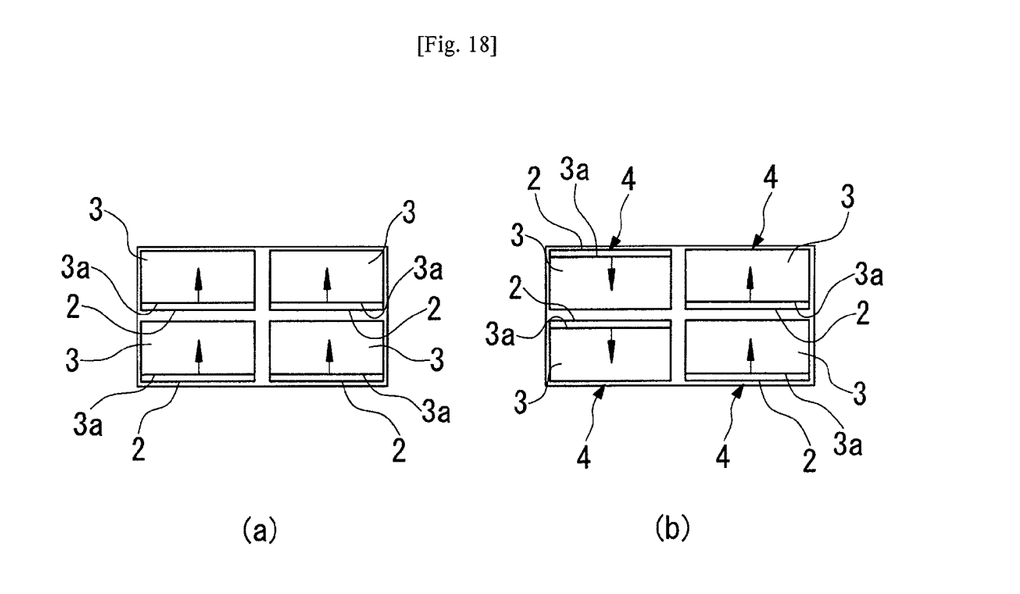
FIG. 18 is a diagram showing planar light-emitting device samples to compare a planar light-emitting device according to the present invention with a conventional planar light-emitting device, of which: part (a) is a plan view of a sample of a conventional planar light-emitting device; and part (b) is a plan view of a sample of the fifth embodiment of the present invention.

FIG. 18 shows planar light-emitting device samples in which four lightguide plates 3 are arranged in a matrix of 2 vertical rows and 2 horizontal rows. Part (a) of FIG. 18 shows a sample in which the light entering direction is the same for all the lightguide plates, as in the above-described conventional planar light-emitting device. Part (b) of FIG. 18 shows a sample in which the light entering direction is alternately reversed for each of the vertical rows of lightguide plates, as shown in FIG. 12. With these samples, we measured the luminance distribution on the light-exiting surface of each lightguide plate. We divided each lightguide plate into 9 areas in a matrix of 3 vertical rows and 3 horizontal rows and conducted a luminance measurement for each area, as shown in Table 1 below.

TABLE 1

|  |  |  |  |  |  |  | Average |
|---|---|---|---|---|---|---|---|
| Luminance according to a conventional art (same direction arrangement) | | | | | | | |
|  | 3261 | 3305 | 3042 | 3211 | 3272 | 2831 | 3153 |
|  | 3056 | 3266 | 2997 | 3279 | 3475 | 2670 | 3124 |
|  | 2882 | 3016 | 2658 | 3078 | 3143 | 2550 | 2888 |
|  | 3059 | 3076 | 3013 | 3890 | 3950 | 3203 | 3365 |
|  | 3035 | 3197 | 3089 | 4066 | 4123 | 3275 | 3464 |
|  | 2406 | 2698 | 2561 | 3357 | 3342 | 2925 | 2882 |
| Average | 2949 | 3093 | 2893 | 3480 | 3550 | 2909 |  |
| Luminance according to the present invention (reverse direction arrangement) | | | | | | | |
|  | 2785 | 2934 | 3032 | 3478 | 3560 | 2885 | 3112 |
|  | 3163 | 3492 | 3364 | 3224 | 3364 | 2586 | 3199 |
|  | 3252 | 3535 | 3469 | 2976 | 2964 | 2259 | 3076 |
|  | 2466 | 2778 | 2763 | 3894 | 3928 | 3203 | 3172 |
|  | 2712 | 2899 | 2805 | 3886 | 3942 | 3146 | 3232 |
|  | 2895 | 3091 | 2951 | 3112 | 3151 | 2731 | 2988 |
| Average | 2878 | 3121 | 3064 | 3428 | 3484 | 2801 |  |

Figure 19:
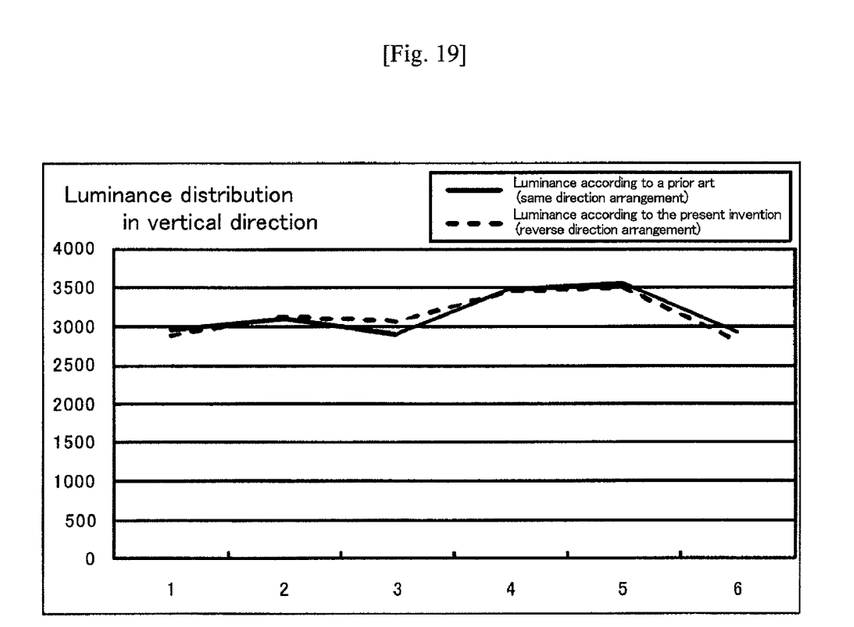
FIG. 19 is a diagram showing the luminance distribution in vertical direction on the light-exiting surface of the planar light-emitting device samples shown in FIG. 18.
Figure 20:
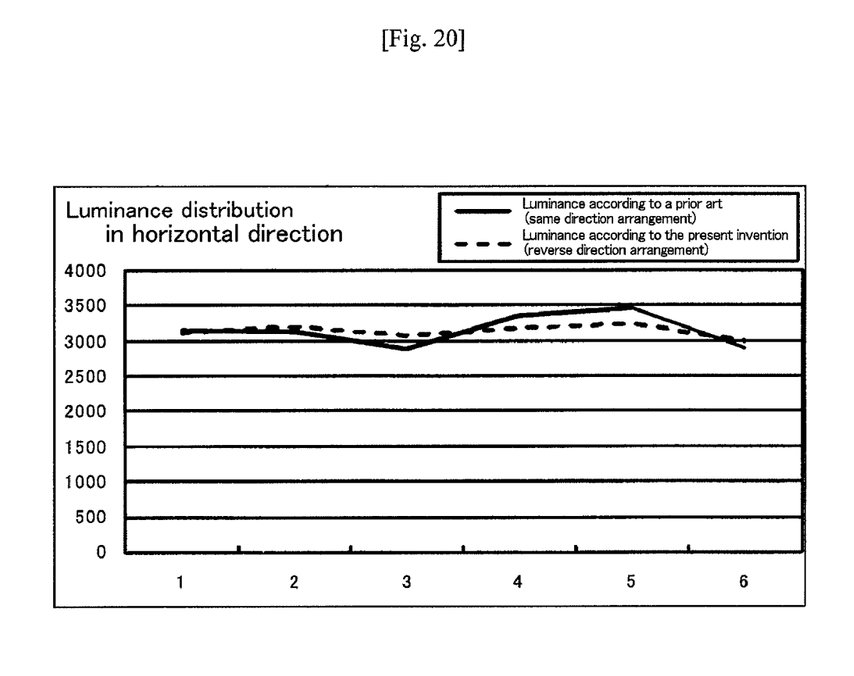
FIG. 20 is a diagram showing the luminance distribution in horizontal direction on the light-exiting surface of the planar light-emitting device samples shown in FIG. 18.

FIG. 19 shows the averages of luminances in the areas in the vertical direction obtained in Table 1 above. FIG. 20 shows the averages of luminances in the areas in the horizontal direction in Table 1 above.

It will be understood from these measurement results that there is no substantial difference in the averages of luminances in the divided areas in the vertical direction between the conventional lightguide plate arrangement shown in part (a) of FIG. 18 and the arrangement according to the present invention shown in part (b) of FIG. 18, but the averages of luminances in the divided areas in the horizontal direction are more equalized in the arrangement of the present invention than in the conventional arrangement. In addition, the present invention shows a smaller difference between the maximum and minimum values and exhibits improved luminance uniformity.

Thus, in the lightguide plate arrangement according to the present invention in part (b) of FIG. 18, the directions of light entering the lightguide plates 3 are opposite to each other between the adjacent vertical rows. With this arrangement, the luminance distributions on these lightguide plates 3 are equalized to obtain favorable luminance uniformity as a whole.

It should be noted that, in the above-described example, luminance measurement is conducted for a combination of four lightguide plates 3 arranged in a matrix of 2 by 2; therefore, the difference in luminance between the conventional arrangement and the arrangement according to the present invention is relatively small. The difference can be increased by increasing the number of lightguide plates 3 used. Accordingly, the advantageous effects of the present invention can be manifested more remarkably when the present invention is applied to a large-sized liquid crystal television system or the like in which a larger number of lightguide plates 3 are used.

It should be noted that the present invention is not necessarily limited to the foregoing embodiments but can be modified in a variety of ways without departing from the scope of the present invention.

For example, although rectangular lightguide plates are used in the foregoing embodiments, square lightguide plates may also be used.

Although hexagonal lightguide plates are used in the embodiment shown in FIG. 17, triangular or other polygonal lightguide plates may also be employed besides hexagonal ones. Properly selecting and arranging such polygonal lightguide plates will allow a planar light-emitting device to be compatible with various screen configurations.

In the embodiments shown in FIGS. 6 and 7, horizontally adjacent lightguide plates are configured to receive light entering them in vertically opposite directions to each other. These embodiments may be modified as follows. With the displaced lightguide plate arrangements left unchanged, the orientation of each lightguide plate is changed to form a configuration in which vertically adjacent lightguide plates will receive light entering them in horizontally opposite directions to each other.

RGB-LEDs may also be employed as the LED light sources to emit light of all colors. For example, an RGB-LED may comprise a combination of a red LED element (R), a green LED element (G) and a blue LED element (B) mounted in one package. Alternatively, LED light sources emitting mutually different colors of light may be provided for each lightguide plate. In these cases, it is possible to illuminate a liquid crystal display panel or the like with various colors of light over the whole planar light-emitting device or for each light-emitting unit by controlling the applied electric current in each LED. Although LED light sources are employed as light sources in the foregoing embodiments, fluorescent lamps or other types of light sources may also be employed.

Although one diffusing plate and one diffusing sheet are used in the backlight unit in the foregoing embodiments, either of the diffusing plate and the diffusing sheet may be omitted, or at least either of them may comprise a plurality of them. In addition, the backlight unit may also have a diffusing plate or sheet between the prism sheet and the liquid crystal display panel. In other words, the installation position and the number of diffusing plates or sheets used are properly set with haze taken into account to correct luminance unevenness.

Although one prism sheet is used in the foregoing embodiments, the backlight unit may also have two prism sheets.

Although the foregoing embodiments employ a diffusing plate, a diffusing sheet and a prism sheet, each having a size corresponding to that of the liquid crystal display panel, these members may each comprise a plurality of split segments that are arranged side by side in the same way as the lightguide plates.

It should be noted that the present invention is not necessarily limited to the foregoing embodiment but can be modified in a variety of ways without departing from the gist of the present invention.

The invention claimed is:

1. A planar light-emitting device comprising a plurality of light-emitting units, each light-emitting unit comprising:
    a lightguide plate of a regular quadrangular shape having an upper surface as a light-exiting surface, a lower surface opposite to the upper surface, a peripheral side surface extending between respective peripheral edges of the light-exiting surface and the lower surface, and the peripheral side surface having a front-side surface, a rear-side surface opposite to the front-side surface, and right and left side surfaces connecting both ends of the front-side surface and the rear side surface; and
    a light source disposed adjacently to one part of the peripheral side surface of the lightguide plate to emit light into the lightguide plate;
    the light-emitting units being arranged in a plurality of rows, the upper surfaces of the lightguide plates being flush with each other, and the lightguide plates that are aligned in one row being displaced relative to the lightguide plates that are aligned in one of adjacently disposed rows of the one row.

2. The planar light-emitting device of claim 1, wherein the light sources of the light-emitting units are disposed to face either one of the front-side surface and the rear-side surface of the corresponding lightguide plates.

3. The planar light-emitting device of claim 1, wherein in the adjacently disposed rows, the light sources in the one row are disposed to face the front-side surfaces of the lightguide plates that are aligned in the one row, and light sources in the one of adjacently disposed rows are disposed to face the rear-side surface of the lightguide plates that are aligned in the one of adjacently disposed rows.

4. The planar light-emitting device of claim 3, wherein the light sources in all the rows are disposed to face a same position of the peripheral side surface of each of the lightguide plates.

5. A planar light-emitting device comprising a plurality of light-emitting units, each light-emitting unit comprising:
    a lightguide plate having an upper surface as a light-exiting surface, a lower surface opposite to the upper surface, a peripheral side surface extending between respective peripheral edges of the light-exiting surface and the lower surface, and the peripheral side surface having a front-side surface, a rear-side surface opposite to the front-side surface, and right and left side surfaces connecting both ends of the front-side surface and the rear side surface; and
    a light source disposed adjacently to one part of the peripheral side surface of the lightguide plate to emit light into the lightguide plate;
    the light-emitting units being arranged in a plurality of rows, the upper surfaces of the lightguide plates being flush with each other, and the lightguide plates that are aligned in one row being displaced relative to the lightguide plates that are aligned in one of adjacently disposed rows of the one row;
    wherein in the adjacently disposed rows, the light sources in the one row are disposed to face the front-side surfaces of the lightguide plates that are aligned in the one row, and light sources in the one of adjacently disposed rows are disposed to face the rear-side surface of the lightguide plates that are aligned in the one of adjacently disposed rows; and
    wherein directions of light entering the lightguide plates of the light-emitting units in alternate ones of the rows are same as each other, and directions of light entering the lightguide plates of the light-emitting units in remaining rows are opposite to each other.

6. The planar light-emitting device of claim 1, wherein directions of light entering the lightguide plates of the light-emitting units are, as viewed in a plan view, perpendicular to the direction of the rows.

7. The planar light-emitting device of claim 6, wherein directions of light entering the lightguide plates of the light-emitting units in all the rows are same as each other.

8. A planar light-emitting device comprising a plurality of light-emitting units, each light-emitting unit comprising:
    a lightguide plate having an upper surface as a light-exiting surface, a lower surface opposite to the upper surface, a peripheral side surface extending between respective peripheral edges of the light-exiting surface and the lower surface, and the peripheral side surface having a front-side surface, a rear-side surface opposite to the front-side surface, and right and left side surfaces connecting both ends of the front-side surface and the rear side surface; and
    a light source disposed adjacently to one part of the peripheral side surface of the lightguide plate to emit light into the lightguide plate;
    the light-emitting units being arranged in a plurality of rows, the upper surfaces of the lightguide plates being flush with each other, and the lightguide plates that are aligned in one row being displaced relative to the lightguide plates that are aligned in one of adjacently disposed rows of the one row;
    wherein directions of light entering the lightguide plates of the light-emitting units are, as viewed in a plan view, perpendicular to the direction of the rows; and
    wherein directions of light entering the lightguide plates of the light-emitting units are reversed for every row.

9. The planar light-emitting device of claim 1, wherein the lightguide plates of the light-emitting units are arranged in a matrix of vertical rows and horizontal rows, adjacent rows in one of the vertical and horizontal rows being displaced relative to each other in a direction in which the lightguide plates are aligned in each of the adjacent rows.

10. The planar light-emitting device of claim 9, wherein directions of light entering the lightguide plates of the light-emitting units are the direction of the one of the vertical and horizontal rows in which the lightguide plates are aligned.

11. The planar light-emitting device of claim 10, wherein directions of light entering the lightguide plates of the light-emitting units are one direction along the direction of one of the vertical and horizontal rows.

12. The planar light-emitting device of claim 10, wherein directions of light entering the lightguide plates of all the light-emitting units are same as each other.

13. A planar light-emitting device comprising a plurality of light-emitting units, each light-emitting unit comprising:
    a lightguide plate having an upper surface as a light-exiting surface, a lower surface opposite to the upper surface, a peripheral side surface extending between respective peripheral edges of the light-exiting surface and the lower surface, and the peripheral side surface having a front-side surface, a rear-side surface opposite to the front-side surface, and right and left side surfaces connecting both ends of the front-side surface and the rear side surface; and
    a light source disposed adjacently to one part of the peripheral side surface of the lightguide plate to emit light into the lightguide plate;
    the light-emitting units being arranged in a plurality of rows, the upper surfaces of the lightguide plates being flush with each other, and the lightguide plates that are aligned in one row being displaced relative to the lightguide plates that are aligned in one of adjacently disposed rows of the one row;

wherein the lightguide plates of the light-emitting units have a regular quadrangular shape and are arranged in a matrix of vertical rows and horizontal rows, adjacent rows in one of the vertical and horizontal rows being displaced relative to each other in a direction in which the lightguide plates are aligned in each of the adjacent rows;

wherein directions of light entering the lightguide plates of the light-emitting units are the direction of the one of the vertical and horizontal rows in which the lightguide plates are aligned; and wherein directions of light entering the lightguide plates of the light-emitting units in alternate rows of the one of the vertical and horizontal rows are same as each other, and directions of light entering the lightguide plates of the light-emitting units in remaining rows are opposite to each other.

14. The planar light-emitting device of claim 10, wherein directions of light entering the lightguide plates of the light-emitting units are, as viewed in a plan view, perpendicular to the direction of the one of the vertical and horizontal rows.

15. The planar light-emitting device of claim 14, wherein directions of light entering the lightguide plates of the light-emitting units in all the rows are same as each other.

16. A planar light-emitting device comprising a plurality of light-emitting units, each light-emitting unit comprising:

a lightguide plate having an upper surface as a light-exiting surface, a lower surface opposite to the upper surface, a peripheral side surface extending between respective peripheral edges of the light-exiting surface and the lower surface, and the peripheral side surface having a front-side surface, a rear-side surface opposite to the front-side surface, and right and left side surfaces connecting both ends of the front-side surface and the rear side surface; and a light source disposed adjacently to one part of the peripheral side surface of the lightguide plate to emit light into the lightguide plate;

the light-emitting units being arranged in a plurality of rows, the upper surfaces of the lightguide plates being flush with each other, and the lightguide plates that are aligned in one row being displaced relative to the lightguide plates that are aligned in one of adjacently disposed rows of the one row;

wherein the lightguide plates of the light-emitting units have a regular quadrangular shape and are arranged in a matrix of vertical rows and horizontal rows, adjacent rows in one of the vertical and horizontal rows being displaced relative to each other in a direction in which the lightguide plates are aligned in each of the adjacent rows;

wherein directions of light entering the lightguide plates of the light-emitting units are the direction of the one of the vertical and horizontal rows in which the lightguide plates are aligned;

wherein directions of light entering the lightguide plates of the light-emitting units are, as viewed in a plan view, perpendicular to the direction of the one of the vertical and horizontal rows; and wherein directions of light entering the lightguide plates of the light-emitting units are opposite to each other for every row in one of the vertical and horizontal rows.

17. A liquid crystal display apparatus comprising:
a liquid crystal display panel; and
the planar light-emitting device of claim 1, which is disposed on a lower side of the liquid crystal display panel.

18. A liquid crystal display apparatus comprising:
a liquid crystal display panel; and
the planar light-emitting device of claim 9, which is disposed on a lower side of the liquid crystal display panel.

* * * * *